April 1, 1969 R. L. GELTING 3,436,272
STACKED FUEL CELLS

Filed Oct. 12, 1966 Sheet 1 of 2

INVENTOR
RAYMOND L. GELTING
Charles G. Warren
BY ATTORNEY

April 1, 1969    R. L. GELTING    3,436,272
STACKED FUEL CELLS

Filed Oct. 12, 1966

— 3,436,272
STACKED FUEL CELLS
Raymond L. Gelting, Manchester, Conn., assignor to United Aircraft Corporation, East Hartford, Conn., a corporation of Delaware
Filed Oct. 12, 1966, Ser. No. 586,252
Int. Cl. H01m 27/02
U.S. Cl. 136—86                                    5 Claims This invention relates to a manifold arrangement for supplying one of the gases to a plurality of fuel cells arranged in a stack.

It has been found desirable to provide in the air chamber in each fuel cell a plurality of airflow passages that will direct the air over the surface of the electrode in a plurality of paths so that the contact of the incoming air will not be located all at one point on the surface of the electrode. This has become particularly critical where the moisture content of the air entering the cell is not controlled and should the air be somewhat drier than normal the electrode dries out adjacent to the air inlet and that portion of the electrode fails to function properly. This arrangement of a plurality of air paths has necessitated a provision externally of the stack of cells for connecting the supply of air to each of the several inlet openings to the gas paths and also a connection to each of the air outlets to collect the air escaping from the fuel cell. Accordingly, one feature of the present invention is a manifolding arrangement by which air from a single chamber may be supplied suitably to the several inlet passages for the gas paths within the air space of the air electrode. Another feature of the invention is an arrangement which permits establishment of communication with all of the air inlets to the several rows of openings in the several cells from a single chamber located externally of the stack of cells.

Other features and advantages will be apparent from the specification and claims, and from the accompanying drawings which illustrate an embodiment of the invention.

Figure 1:
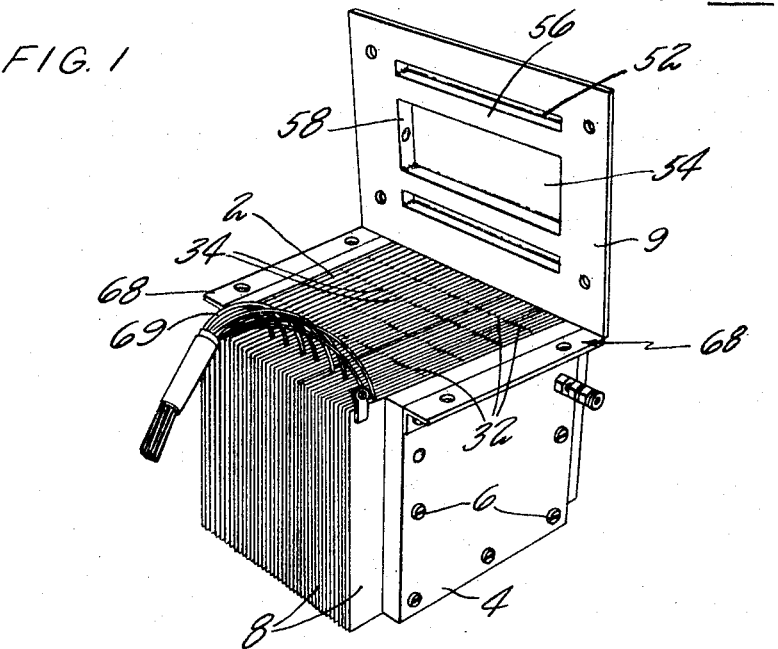
FIG. 1 is a perspective view of a stack of fuel cells embodying the invention.

The cell stack is made up of a plurality of individual fuel cells 2 in stacked relation and the stack of cells is held together between end plates 4 by a plurality of through bolts 6. Each cell has projecting cooling fins 8 which appear on opposite sides of the stack of cells, as shown, and the oxidant is supplied to the fuel cell through a manifold 9 located at the top of the cell. This manifold is a two-part cap, as will be described later.

Figure 2:
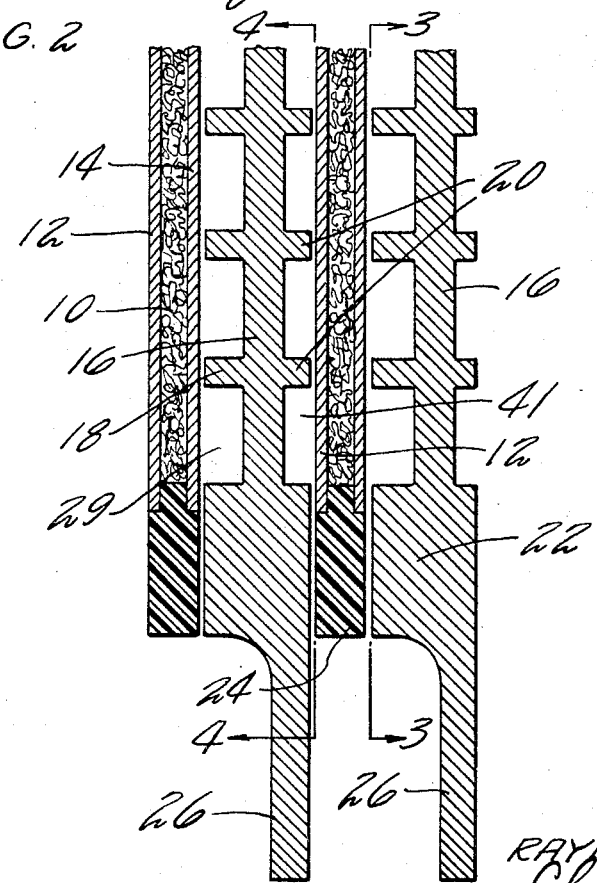
FIG. 2 is a horizontal sectional view through two fuel cells of the stack slightly spaced apart for clarity.

Referring to FIG. 2, each fuel cell consists of an electrolyte matrix 10 which retains therein the liquid electrolyte. On opposite sides of the matrix 10 is located the fuel electrode 12 and the oxidant electrode 14, these electrodes being, for example, catalyzed screen electrodes as described in the copending application of Richman, Ser. No. 491,871, filed Sept. 30, 1965. It will be understood, however, that other types of electrodes are equally suitable. Air is supplied to the surface of the oxidant electrode opposite to the matrix by a combined manifold and cooling plate 16, the latter having a plurality of projections 18, FIG. 3, on one side to provide for support of the adjacent electrode 14 uniformly over substantially the entire area. The opposite side of the manifold and cooling plate has shorter projections 20, FIG. 4, and these projections are in engagement with the fuel or hydrogen electrode 12 of the adjacent fuel cell, as will be apparent. The entire periphery of the cooling plate is thickened as at 22 to engage with the plastic frame 24 of the individual fuel cell assemblage, that is to say the matrix 10 and opposed electrodes 12 and 14. Thus when the plurality of fuel cells are assembled in stacked relation, the plastic frames for the several fuel cells are clamped between the thickened edges 22 of the cooling plate and leakage of air or fuel into and out of the stack of cells is prevented. Each of the cooling plates has a projecting fin 26 on opposite ends, as better shown in FIG. 3, for the purpose of removing heat from within the cell.

The path of the air through the manifold portion of the cooling plate 16 and thus over the surface of the electrode is controlled by partitions 28 provided on the surface of the cooling plate. In the arrangement shown there are two partitions 28 located each one-fourth of the way across the surface of the air compartment 29 and extending downwardly from the thickened top edge 22 of the cooling plate to a point spaced from the opposite bottom edge. There is also a central partition 30 that exends the entire distance across the air compartment of the cooling plate from top to bottom. In the arrangement shown air enters the air manifold through spaced grooves 32 in the thickened top edge of the cooling plate 16 into the spaces between the partitions 28 and the adjacent peripheral edges of the fuel cell. The air flows down around the lower edge of the partitions 28 and back upwardly between the partitions 28 and 30 and discharges through passages 34 in the top edge of the cooling plate.

Figure 4:
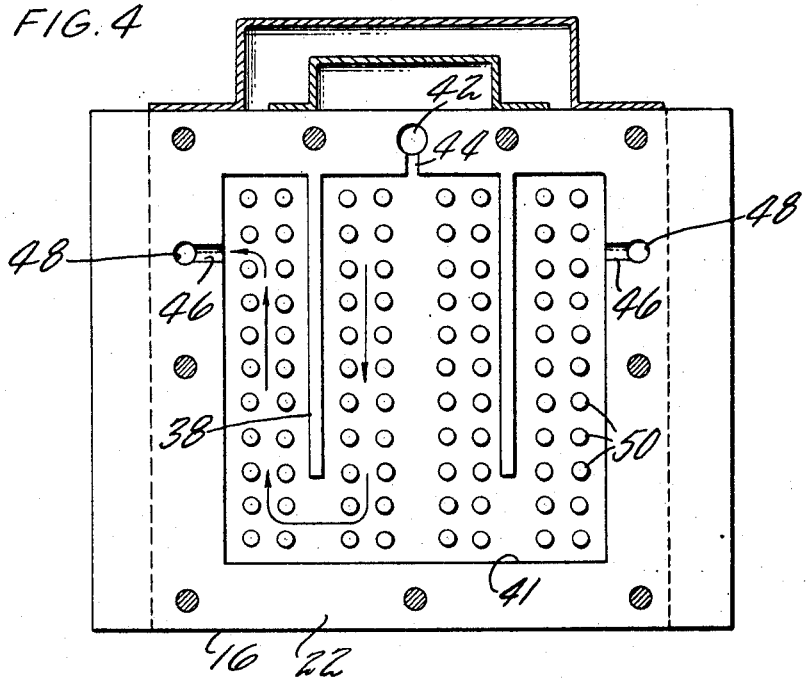
FIG. 4 is a view similar to FIG. 3 but along line 4—4 of FIG. 2.

A similar arrangement is provided on the fuel or hydrogen side of the cooling plate except that the flow of fuel is in a direction opposite to the flow of air. As shown in FIG. 4 the cooling plate has partitions 38 corresponding in arrangement to the partitions 28 on the air side of the cooling plate but located on the opposite or fuel side of the plate. Fuel, however, is supplied to the fuel compartment 41 through a passage 42 extending axially through the stack in the thickened periphery of the cooling plates and the associated plastic frames at the top of the stack of fuel cells. From this passage communicating grooves 44 admit the fuel to the space between the partitions 38. The fuel flows downwardly in this space around the bottom ends of the partitions 38 and is discharged through lateral grooves 46 into the axially extending connecting passages 48. Thus the flow of fuel in its manifold is in the opposite direction to the flow of air in its manifold on the opposite side of the cooling plate. This side of the plate also has the spacer projections 50.

When a fuel cell assemblage is made up in this manner it is found that it will operate at a pressure of from 0 to 3 pounds per square inch gage, the pressure being preferably between 1 and 2 pounds. The operating temperature of the cell is preferably between 150 and 180° F. since at this temperature it has been found that there is no material problem in balancing the water production within and water content of the cell. With this cell the electrolyte is preferably a base being, for example, potassium hydroxide and the electrodes may be a nickel sinter which is catalyzed or, as above referred to, a catalyzed screen electrode.

Figure 3:
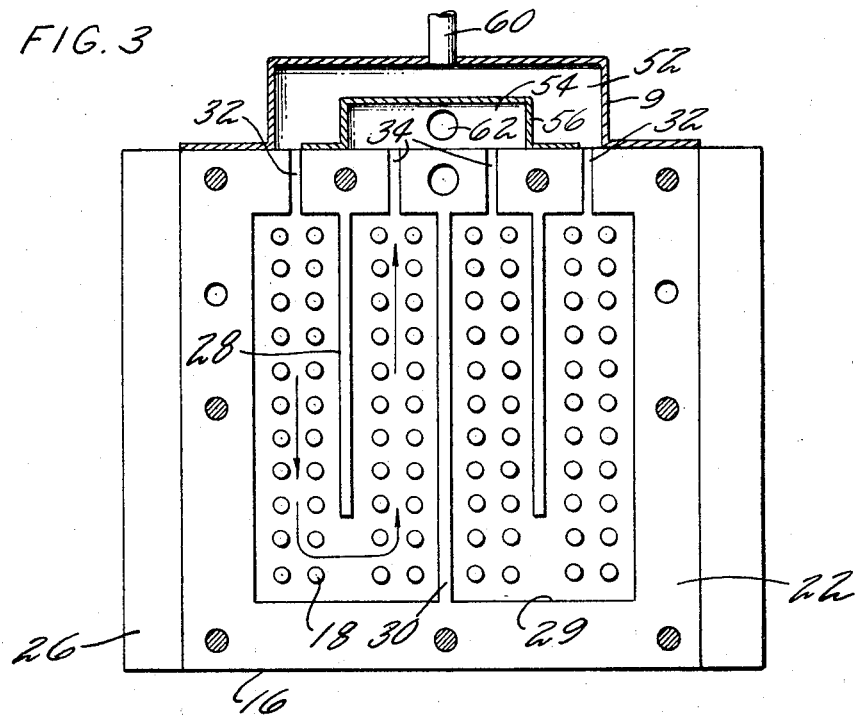
FIG. 3 is a sectional view susbtantially at right angles to the view of FIG. 2 substantially along the line 3—3 of FIG. 2.

As shown in FIG. 1, the openings or grooves 32 in the assemblage of cells are in alignment with one another in spaced rows as are the passages or grooves 34. The inlet passages 32 are connected by the manifold cap 9 which is bolted to the top of the fuel cell stack when in closed position, as shown in FIG. 3. This cap has a chamber 52 therein which provides a communication with all of the passages 32 and a smaller chamber 54 that provides a communication with all of the passages 34. The wall 56 forming the chamber 54 intersects with and is an integral part of the main cap terminating as best shown in FIG. 1 in the end wall 58 of the portion of the cap that forms the main chamber 53. Each of the chambers 52 and 56 is connected externally as by an inlet spigot 60 and an outlet spigot 62.

With this arrangement each inlet port 32 of all of the parallel and series connected U-paths for the flow of air feeds from a common plenum chamber 52 in the cap for the cell stack. Similarly all of the outlets 34 discharge into a common plenum chamber 54 in the same cap. Further, these chambers are made sufficiently large to insure uniform distribution of air to each of the individual cells. The plenums are installed after the cell stack is completely assembled and thus all of the inlet and outlet ports 32 and 34 may be visually insepected before the cap is fastened down to assure freedom of obstruction for these ports. The arrangement also makes possible the concept of allowing excess water and electrolyte to collect as a pool in the bottoms of the air and fuel passages since a substantial amount of fluid may collect at this point before the level reaches the lower edges of the partitions 28 and 38.

The arrangement of FIG. 1 shows the through bolts 6 which serve to hold the assemblage of fuel cells in stacked relation with the cooling fins, which are thinner than the edge portions 22 of the plates exposed at opposite sides in spaced relation to one another. The end plates 4 for the cell carry projecting flanges 68 adjacent the top edge by which the cap carrying the plenum chambers may be securely bolted in position after the stack has been assembled and clamped such that the cap is placed in position only after the stack is otherwise completely assembled. The cap 9 has a peripheral flange to form a tight seal with the end plates and the top surfaces of the cooling plates and the edges of the plastic frames 24 for the cells. Since the bottom surface of the cap is flat between the two chambers and the top surface of the cell stack is also flat, the edges of the wall 56 will also seal tightly against the cell stack, if necessary with appropriate gaskets.

It is to be understood that the invention is not limited to the specific embodiment herein illustrated and described, but may be used in other ways without departure from its spirit as defined by the following claims.

I claim:

1. A fuel cell assembly having a plurality of individual cells in stacked relation, each cell including spaced oxidant and fuel electrodes having an electrolyte space therebetween, chambers on the sides of the electrodes opposite to the electrolyte space for oxidant and fuel gas respectively, one of said chambers for each cell having a plurality of passages formed therein through which the gas is guided within the chamber, each of said passages having an inlet and an outlet at the periphery of the cell such that when the cells are arranged in a stack all of the openings will be located in respective rows in one side surface of the stack, and a cover plate attached to the stack of cells along said one surface of the stack and having a chamber therein in a position to overlie and communicate with all of the inlet passages in one of the rows of openings.

2. A fuel cell assembly as in claim 1 in which there are several rows of inlet openings and the chamber in the cover plate communicates with all of the inlet openings in the several rows of inlet openings.

3. A fuel cell assembly as in claim 1 in which the cover plate has a second chamber therein in a position to overlie and communicate with the several rows of outlet openings thereby to provide gaseous communication from said outlet openings to said second chamber.

4. A fuel cell assembly including a plurality of individual fuel cells arranged in a stack of cells in side-by-side relation each cell including spaced fuel and oxidant electrodes having an electrolyte space therebetween, gas chambers on the sides of each electrode opposite to the electrolyte space to receive fuel and oxidant respectively, one of said gas chambers for each of the electrodes of each fuel cell having partitions therein to define a plurality of passages through which the gas is directed over the surface of the associated electrode, each passage having an inlet opening and an outlet opening with the openings for corresponding passages in the electrodes of the several cells of the stack located in alignment with one another in the peripheries of the cells to form rows of openings in one surface of the stack when the cells are assembled and a cover plate engaging said surface, said cover plate having a chamber therein overlying appropriate rows of openings to the cell passages.

5. A fuel cell assembly as in claim 4 in which said cover plate has a second chamber therein overlying other of the rows of openings to the cell passages such that one of said chambers communicates with all of the rows of inlet openings and the other chamber is in communication with all of the rows of outlet openings.

References Cited

UNITED STATES PATENTS

| 3,160,528 | 12/1964 | Dengler et al. | 136—86 |
| 3,321,334 | 5/1967 | Palmer | 136—86 |
| 3,340,095 | 9/1967 | Fitton | 136—86 |

ALLEN B. CURTIS, *Primary Examiner.*